March 6, 1962 — L. H. HOSBEIN — 3,023,545
COMPOSITE REFRACTORY WALL
Filed Aug. 4, 1958 — 3 Sheets-Sheet 1

INVENTOR.
LOUIS H. HOSBEIN

ATTORNEYS

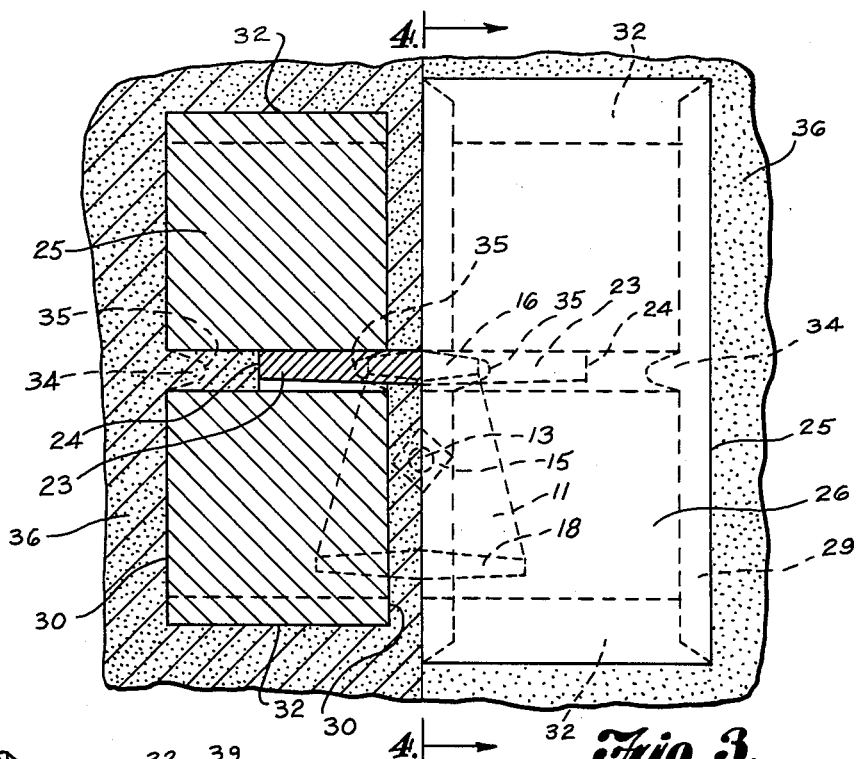

March 6, 1962 L. H. HOSBEIN 3,023,545
COMPOSITE REFRACTORY WALL
Filed Aug. 4, 1958 3 Sheets-Sheet 3
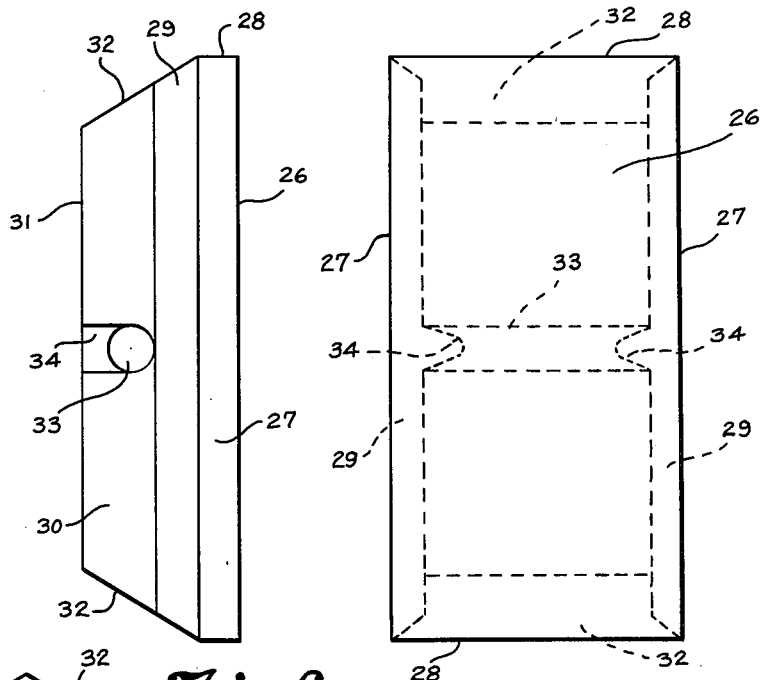
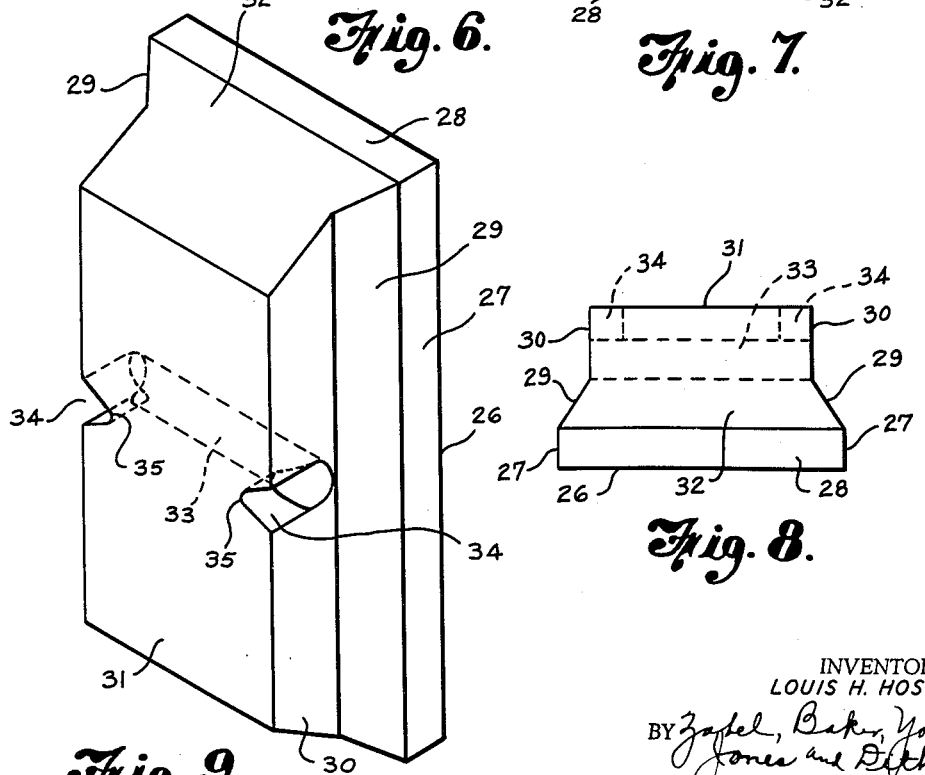
INVENTOR.
LOUIS H. HOSBEIN
BY
ATTORNEYS

United States Patent Office 3,023,545
Patented Mar. 6, 1962

3,023,545
COMPOSITE REFRACTORY WALL
Louis H. Hosbein, Glencoe, Ill., assignor to M. H. Detrick Company, Chicago, Ill., a corporation of Delaware
Filed Aug. 4, 1958, Ser. No. 752,855
1 Claim. (Cl. 50—331)

My invention relates to composite refractory walls, and more particularly to a wall that includes monolithic refractory material and refractory tiles that are so interrelated that the refractory tiles serve as bracket members for keying the monolithic refractory material to a rigid metallic wall, thus providing a refractory lining for a metallic wall that is supported by the metal wall and in which the refractory bracket members serve not only as retaining means for the monolithic refractory material, but also as portions of the inner face of the refractory wall, flush with the face of the refractory material that is exposed to the heat.

My improved composite refractory wall is so constructed and arranged that there is a considerable quantity of monolithic refractory material back of the refractory tiles that are associated therewith so that these tiles will serve to firmly hold the monolithic refractory material to the metallic wall. In order to obtain such a keying action of the refractory tiles or brackets, the same are made relatively thin or shallow in the direction of thickness of the wall and are of relatively greater length and width than depth or thickness. Furthermore, said refractory tiles or bracket members are mounted in pairs on suitable metallic bracket members so as to provide large areas of said wall that are provided with such refractory members on the exposed face thereof, between which and the metallic wall the monolithic refractory material is inserted and held.

In the use of such monolithic refractory material, the customary manner of application to the wall is to provide a relatively dry plastic mixture that is sufficiently fluid that it can still be forced from a suitable gun under pressure against the metallic wall and between the metallic wall and the refractory tiles or brackets, such monolithic refractory material being in a relatively thick plastic state and being made up of a cement or binder and refractory aggregate particles. In order to avoid any disengagement of any of the monolithic refractory material from the wall either before or after it has been subjected to heating, it is desirable to avoid any thin exposed layers thereof on the inner face of the wall. In order to avoid the presence of any such thin layers or strips of such monolithic refractory material or any thin edge portion thereof at the inner face of the wall, I have provided my improved refractory bracket members with a rim portion extending all the way around the same on all four sides thereof immediately adjacent the heat exposed flat inner face thereof, said rim portions each having a flat face extending perpendicularly to the inner or heat exposed face of the refractory bracket member so that the monolithic refractory material adjacent the refractories will be of a depth extending all the way to the metallic wall at this location, thus avoiding any such thin exposed monolithic material portions. Thus all keying portions of the refractory bracket or tile are located in spaced relation to the exposed face of the wall the distance of at least the thickness of this rib portion.

Said refractory tiles or bracket members are further of such a character that the same can be reversed top for bottom if desired, or can be used either as a left or right refractory bracket mounted on one of the metallic bracket members. In order to accomplish this purpose, the attaching portion of each of said refractory bracket members is provided with a transverse passage therethrough and grooves in the side faces thereof that connect with this tranverse passage and open through the rear or outer face of the refractory member.

In order to provide for a positive location of the refractory tiles and firm holding of the monolithic refractory material, I have provided a metallic bracket member that is provided with means that engages in the above referred to grooves, comprising an upper flange at the upper end of the body portion of said metallic bracket that is provided with transverse holding means at the extremity thereof, providing laterally extending holding fingers engaging in said passage, and means for spacing the outer or rear faces of said refractory tiles or bracket members from the metallic wall and preventing any swinging thereof on their mounting, comprising a lower flange on the body portion of said metallic bracket providing an abutment with which the rear or outer face of said refractory members engage, said abutment taking any strain that might otherwise exist off the walls of the grooves in the refractory members in which the upper flange of said metallic bracket is located.

Other objects and advantages of my invention will appear as the description of the drawings proceeds. I desire to have it understood, however, that I do not intend to limit myself to the particular details shown or described except as defined in the claim.

In the drawings:

FIG. 3 is a fragmentary view partly in elevation and partly in section, taken on the line 3—3 of FIG. 2.

FIG. 4 is a fragmentary sectional view taken on the line 4—4 of FIG. 3.

FIG. 5 is a view in perspective of the metallic bracket used in my wall structure.

FIG. 6 is a side elevation of one of the refractory tiles or bracket members used in my improved composite wall.

FIG. 7 is a face view thereof as viewed from the inner or exposed face thereof.

FIG. 8 is a top plan view thereof, and

FIG. 9 is an isometric view thereof as viewed from the outer or rear face of said refractory member.

Figure 1:
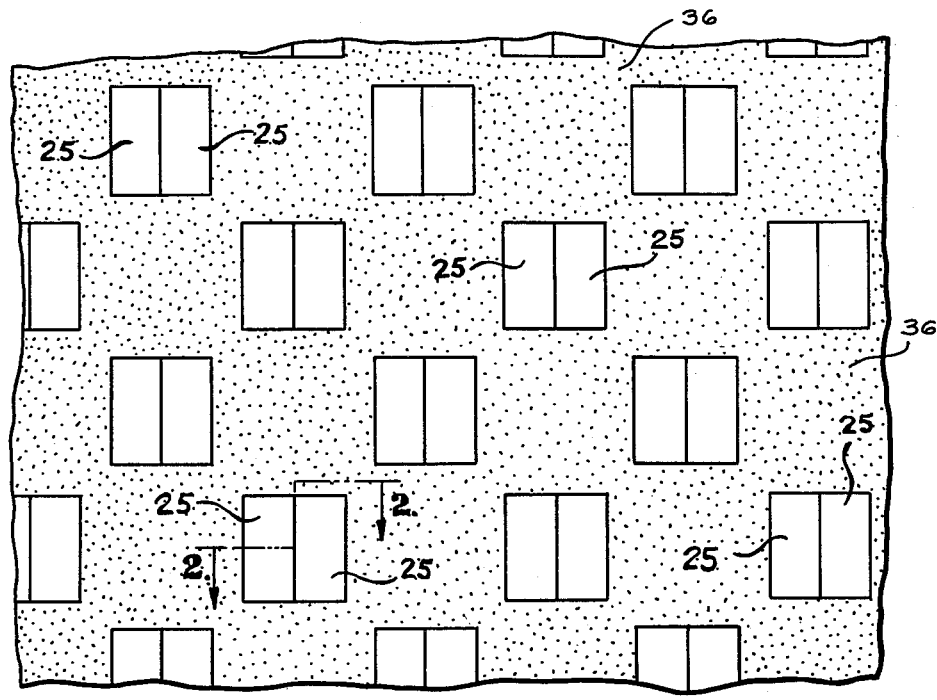
FIG. 1 is a fragmentary elevational view of my improved composite wall as viewed from the inner or exposed face thereof.

Referring in detail to the drawings, in FIGS. 1 to 4 inclusive, is shown a composite wall comprising a rigid metallic wall 10, which may be the wall of a pressure vessel or other container, conduit or housing for which the refractory material composite wall serves as a refractory lining. Secured to said wall 10 are metallic bracket members having vertical substantially flat body portions 11 having openings 12 therein through which retaining elements 13 in the form of studs extend. Said studs 13 are welded to the metallic wall 10 and are provided with screw-threaded end portions 14, with which the nuts 15 engage, each of said studs having a metallic bracket member mounted thereon, which is clamped to the wall 10 by means of the nut 15. Said metallic bracket member is shown more in detail in FIG. 5 and it will be noted that the body portion 11 widens somewhat in a downward direction. At the upper end of the body portion 11 is a flange 16 extending perpendicularly to said body portion. Said flange is slightly thicker at the center thereof than at the side edges thereof, providing a rib 17 running lengthwise of the flange on said bracket. A similar flange 18 is provided at the bottom of said body portion, which is wider and shorter than the flange 16 and which has a flat end face 19 providing an abutment on said bracket spaced from the vertical body portion thereof. In transverse alignment with the flanges 16 and 18 are ribs 20 and 21 that engage the metallic wall 10 and space the body portion of said bracket therefrom.

At the outer extremity of the flange 16 is a retaining formation for mounting refractory members on said metallic bracket, said retaining formation comprising a rounded end 22 on said flange 16 and substantially circular in cross section retaining fingers 23 projecting laterally from the opposite side edges of said flanges 16 perpendicularly thereto, said retaining fingers 23 tapering toward the outer ends 24 thereof, and the ends thereof projecting laterally beyond the side edges of the flange 18. When said brackets are mounted on the rigid metallic wall 10 the laterally projecting retaining fingers 23 extend horizontally, as do the flanges 16 and 18.

Mounted on each of the metallic bracket members is a pair of refractory members 25, which serve as refractory brackets and retaining members for the monolithic refractory material of said composite wall. Each of said refractory members 25 is provided with a flat inner face 26, which is rectangular and which is of considerably greater length than width, the length of said refractory 25, when in position on the metallic bracket member, extending vertically, as is obvious from FIGS. 1 and 3. Extending perpendicularly to the inner face 26 of each of said refractories on each side thereof is a flat face 27, and extending perpendicularly to said inner face on each end of said refractory is a flat face 28, said flat faces extending the full length of the sides and ends of said refractories at their inner ends adjacent said inner face 26. From each of the flat faces 27 the inclined wall portion 29 extends to a side wall 30 of said refractory that extends to the outer or rear flat face 31 thereof and is perpendicular to said outer face 31. The end wall portions 32 of said refractories incline toward each other from the flat end wall portions 28 to the outer or rear face 31 of said refractory. As a result, there is a rib portion formed on each of the ends and sides of the refractory immediately adjacent the inner face 26 thereof, which provides an inclined or beveled retaining shoulder, facing the metallic wall 10, spaced the width of the flat faces 27 and 28 from said flat inner face 26.

Each of said refractories, as will be obvious from FIGS. 6, 7 and 8, is provided with a transverse passage 33 therein, which is preferably circular in cross section and which is of a size adapted to receive one of the fingers 23 of the metallic bracket member upon which the refractory is mounted, said passage 33 extending from one flat side face 30 to the other flat side face 30 of the refractory. Each of said refractory members is also provided with V-shaped in cross section grooves 34 in each of said side faces 30 having curved bottom portions 35 and intersecting the passage 33, as shown in FIG. 9.

Figure 2:
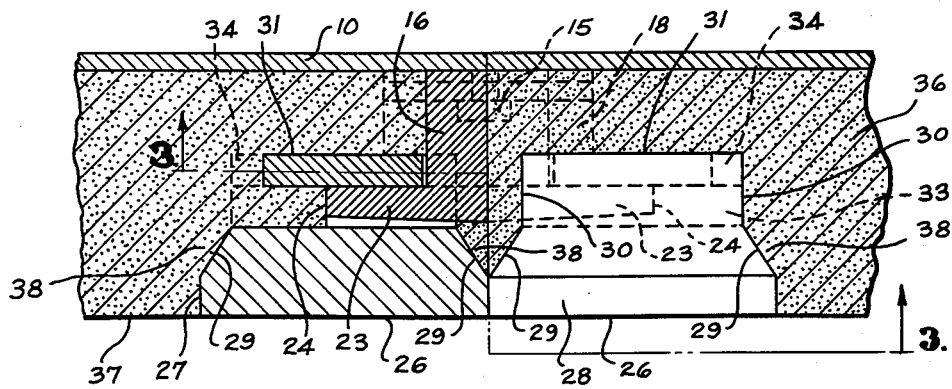
FIG. 2 is a fragmentary sectional view on an enlarged scale, taken on the line 2—2 of FIG. 1.

When the refractory members 25 are mounted in position on the metallic brackets, the flanges 16 thereof are received in one of the grooves 34 of each of the pair of refractories mounted on said bracket, as shown in FIGS. 2 and 3, and with the fingers 23 of each of said brackets seated in the transverse passages 33 of said refractories. When the paired refractories are so assembled with a bracket, the face 19 of the flange 18 engages the outer or rear face 31 of both of the refractories mounted on said bracket, thus acting as means for properly spacing the refractories from the metallic wall 10 and preventing any swinging of the refractories on the fingers 23, which might exert undue strain on the walls of the grooves 34, in which the flange 16 of the metallic bracket engages. It will be noted that the flange 16 tapers transversely in a similar manner to the substantially V-shaped in cross section groove 34. The cooperating flanges 16 and 18 and the retaining fingers 23 thus serve to hold the refractory members 25 firmly in position on the metallic wall 10. With the refractory members so positioned on the wall, the portions thereof between the junction of the inclined faces 29 and the parallel faces 30 and the inner face 26 constitute the keying portion of the refractory and the portion lying between the rear or outer face 31 of said refractory and the junction of the wall portions 29 and 30 constitutes the attaching portion of said refractory.

With said refractories 25 mounted on the wall, the plastic refractory material 36 is applied to the wall in a stream projected under pressure against the wall 10, in back of the refractories 25 and between the paired refractories 25, so that the inner or exposed face 37 of said monolithic refractory material 36 is flush with the inner faces 26 of the refractory members 25 and so that said monolithic refractory material is filled in completely back of the face 31 of each of the refractories and between said refractories and the metallic wall 10, as well as around all of the metallic brackets. It will be noted upon reference to FIGS. 2 and 4 that said monolithic refractory material at the locations indicated by the numerals 38 and 39 will be held back of the inclined wall portions 29 and 32 that form retaining shoulders adjacent the flat faced portions 27 and 28 of the side and end walls of the refractories and that there are no thin walled portions or strips of the monolithic refractory material at the inner face 37 thereof in any portion of the wall, and particularly no such monolithic refractory material between any projecting portion of said tiles or refactories 25 and the inner face of the wall, that might drop off either before or after the monolithic refractory material of the wall has been heated. It will further be noted that the entire rear face 31 as well as the entire inclined faces 32 and the inclined faces 29 of said refractories serve as retaining means of keying means for the monolithic refractory material, as these portions of the refractories confine large proportions of said monolithic refractory material between themselves and the metal wall 10.

What I claim is:

A composite wall comprising a rigid metallic wall, metal brackets, securing means fixing said brackets to said metallic wall, paired refractory brackets mounted on each of said metal brackets, each of said refractory brackets being of greater length and width than thickness and having an outer attaching portion and an inner keying portion, said keying portion having an inner flat face, rim portions projecting laterally from all the sides of said refractory brackets at the inner ends thereof, each of said rim portions having a flat face extending perpendicularly to said inner face, and said keying portion being reduced on all sides thereof outwardly from said rim portion to provide longitudinal shoulders facing said metallic wall spaced from said inner face the thickness of said rim portion, said outer attaching portion being of less length and width than said keying portion, having a flat outer face and being provided with a transverse passage spaced inwardly from said outer face and with grooves in the side faces thereof extending from said transverse passage at opposite ends thereof through said outer face, said metal brackets each having a body portion, an upper horizontal flange projecting inwardly from said body portion into one of said grooves of each of said refractory brackets mounted thereon, opposed laterally projecting retaining fingers on said upper flange each seated in a transverse passage of one of said refractory brackets and a lower horizontal flange wider and shorter than said upper flange engaging said flat outer face of said pair of refractory brackets to space the same from said metallic wall, said paired refractories having their adjacent vertically extending rim portions in face to face engagement and a filling of monolithic refractory material flush with the inner faces of said refractory brackets extending between said inner and outer faces of said refractory brackets and said metallic wall interlocking said monolithic material with said refractory brackets.

References Cited in the file of this patent

UNITED STATES PATENTS

| | | |
|---|---|---|
| 1,998,733 | Pacific | Apr. 23, 1935 |
| 2,011,701 | Anderson | Aug. 20, 1935 |
| 2,273,898 | Short | Feb. 24, 1942 |
| 2,296,391 | Marchant | Sept. 22, 1942 |
| 2,463,217 | Tonneson | Mar. 1, 1949 |
| 2,618,961 | Williamson | Nov. 25, 1952 |
| 2,725,833 | Reintjes | Dec. 6, 1955 |
| 2,846,867 | Reintjes | Aug. 12, 1958 |
| 2,879,660 | Reintjes | Mar. 31, 1959 |